US012220880B2

(12) United States Patent
Nakayama et al.

(10) Patent No.: US 12,220,880 B2
(45) Date of Patent: Feb. 11, 2025

(54) METHOD FOR PRODUCING TUBE BODY

(71) Applicant: Hitachi Astemo, Ltd., Ibaraki (JP)

(72) Inventors: Takahiro Nakayama, Ibaraki (JP); Kenichi Mori, Ibaraki (JP); Kazuki Ohta, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 226 days.

(21) Appl. No.: 17/884,343

(22) Filed: Aug. 9, 2022

(65) Prior Publication Data
US 2022/0379570 A1 Dec. 1, 2022

Related U.S. Application Data

(63) Continuation of application No. PCT/JP2020/012538, filed on Mar. 19, 2020.

(51) Int. Cl.
B29C 70/30 (2006.01)
B29K 307/04 (2006.01)
B29L 23/00 (2006.01)

(52) U.S. Cl.
CPC .......... B29C 70/30 (2013.01); B29K 2307/04 (2013.01); B29L 2023/22 (2013.01)

(58) Field of Classification Search
CPC .................................................... B29C 70/30
See application file for complete search history.

(56) References Cited

U.S. PATENT DOCUMENTS

| 2,714,414 | A | * | 8/1955 | De Ganahl | B29C 53/828 |
| | | | | | 493/298 |
| 3,068,134 | A | * | 12/1962 | Cilker | B29C 70/083 |
| | | | | | 156/286 |
| 3,249,481 | A | * | 5/1966 | Boggs | B29C 53/60 |
| | | | | | 156/441 |
| 4,125,423 | A | * | 11/1978 | Goldsworthy | B29C 31/002 |
| | | | | | 156/428 |
| 4,309,865 | A | * | 1/1982 | Brunsch | B65H 81/08 |
| | | | | | 57/295 |

(Continued)

FOREIGN PATENT DOCUMENTS

| CN | 101284422 A | 10/2008 |
| DE | 2016479 A1 | 12/1970 |

(Continued)

OTHER PUBLICATIONS

German Office Action issued in German Patent Application No. 11 2020 006 110.8 dated Jun. 15, 2023.

(Continued)

Primary Examiner — Jeffry H Aftergut
(74) Attorney, Agent, or Firm — KENEALY VAIDYA LLP

(57) ABSTRACT

A tube body production method includes: a disposing step of disposing carbon fibers with respect to an outer circumferential surface of a mandrel so that the carbon fibers extend in the axial direction of the mandrel; and a molding step of impregnating the fiber body with a resin on the outer circumferential surface of the mandrel and then heating the resin to mold the resin, wherein the disposing step and the molding step are performed in a state where the axial direction of the mandrel coincides with an up-down direction.

8 Claims, 14 Drawing Sheets

(56) References Cited

U.S. PATENT DOCUMENTS 5,261,980 A * 11/1993 Pearce .................. B29C 70/48
156/169
2017/0191618 A1     7/2017 Kloft et al.

FOREIGN PATENT DOCUMENTS

| DE | 102014008649 A1 | 12/2015 |
|----|-----------------|---------|
| DE | 102014222841 A1 | 5/2016 |
| GB | 1258104 A | 12/1971 |
| JP | H03-265738 A | 11/1991 |
| JP | 5-228931 A | 9/1993 |
| JP | 6-34450 A | 12/1994 |
| JP | 2009-166503 A | 7/2009 |
| JP | 2015145104 A | 8/2015 |
| WO | 2021/186736 A1 | 9/2021 |

OTHER PUBLICATIONS

Chinese Office Action issued in Chinese Patent Application No. 202080094478.9 dated Jun. 29, 2023.
International Search Report and Written Opinion of the International Search Report for PCT/JP2020/012538 dated Jun. 2, 2020.

* cited by examiner

UP ↕ DOWN

UP ↕ DOWN

UP ↕ DOWN

UP ↕ DOWN

METHOD FOR PRODUCING TUBE BODY

CROSS-REFERENCE TO RELATED APPLICATIONS

This application is a PCT Bypass application and claims priority under 35 U.S.C. § 120 to PCT application no. PCT/JP2020/012538 filed on Mar. 19, 2020, the disclosure of which is hereby incorporated by reference in its entirety.

TECHNICAL FIELD

The present invention relates to a method of producing a tube body which is, for example, used as a power transmission shaft of a vehicle.

BACKGROUND ART

Power transmission shafts (propeller shafts) mounted on vehicles each include a tube body extending in the front-rear direction of the vehicle. The tube body transmits power generated by a power plant and decelerated by a transmission to a final reduction gear unit. There is known a tube body made of a fiber reinforced plastic and produced using a mandrel, as a tube body used for such a power transmission shaft (see Japanese Patent Publication No. H03-265738 A).

SUMMARY OF THE INVENTION

Problems to be Solved by the Invention

Known techniques for winding a material over a mandrel includes the filament winding technique, which involves winding a continuous fiber impregnated with a resin, and the sheet winding technique, which involves winding a prepreg (a sheet made by impregnating a fiber material with a resin). The filament winding technique is advantageous for low-cost production but has difficulty in aligning a fiber material along the axial direction of a mandrel, in other words, aligning a fiber material along the axial direction of the tube body. On the other hand, the sheet winding technique allows aligning a fiber material along the axial direction of a mandrel but is disadvantageous in terms of production cost.

Here, assume that L represents the axial direction length over which fibers are disposed over a mandrel, r represents the radius of the outer circumferential surface of the mandrel, and θ represents the orientation angle of the fibers with respect to the mandrel (see FIG. 1). When the orientation angle θ is small such that tan θ<|2πr/L|, the fiber fails to be wound around the mandrel by one or more turns, in which case gravity can cause the fibers to separate from the mandrel.

The present invention is made to resolve such a problem, and it is an object of the present invention to provide a tube body production method with which it is possible to, while reducing the production cost, reduce displacement of a fiber body even when the orientation angle of the fiber body is small.

Means for Solving the Problems

To solve the above-described problems, a tube body production method includes: a disposing step of disposing a fiber body with respect to an outer circumferential surface of a mandrel so that the fiber body extends in an axial direction of the mandrel; and a molding step of impregnating the fiber body with a resin on the outer circumferential surface of the mandrel and then heating the resin to mold the resin, wherein the disposing step and the molding step are performed in a state where the axial direction of the mandrel coincides with an up-down direction.

MODES FOR CARRYING OUT THE INVENTION

Figure 7:
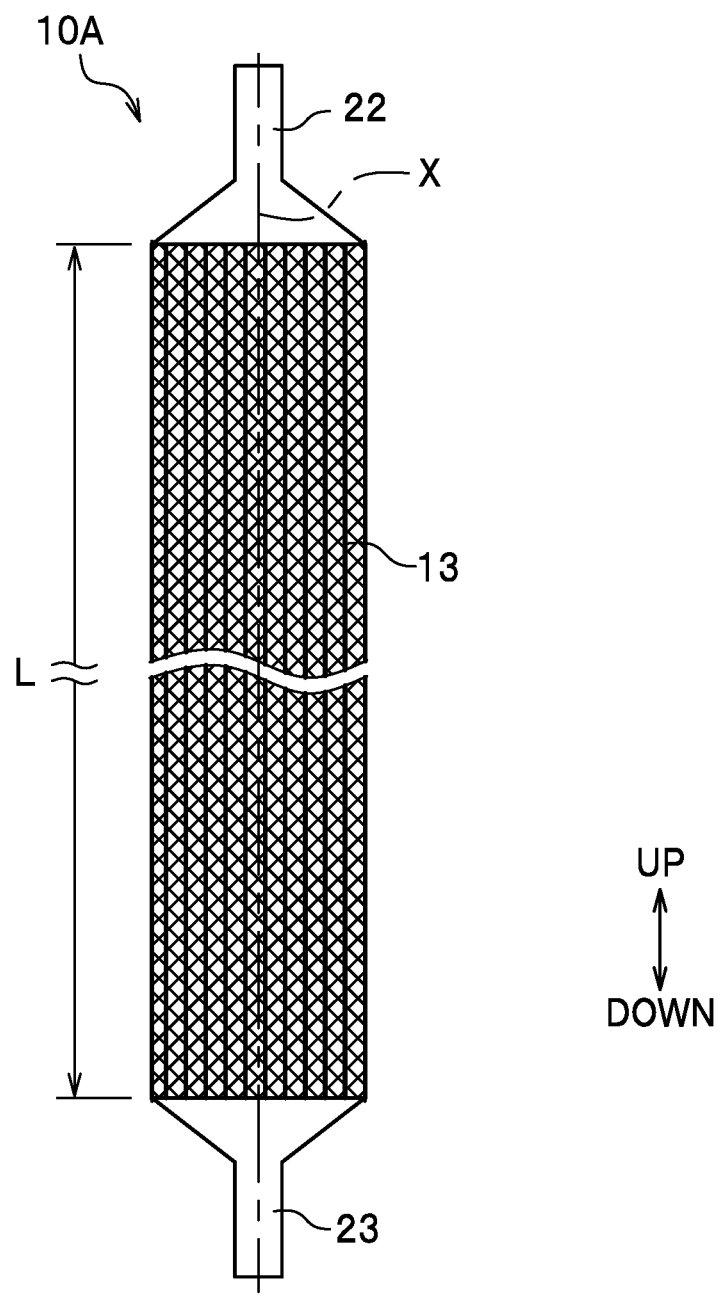
FIG. 7 is a diagram schematically illustrating an example of the tube body according to the first embodiment of the present invention.

An embodiment of the present invention will be described in detail with reference to the drawings, taking an exemplary case of producing a power transmission shaft (propeller shaft) of a vehicle as a tube body using a carbon fiber reinforced plastic. In the descriptions given below, the same elements are denoted by the same reference signs, and overlapping descriptions will be omitted. The drawings referenced in the description are depicted in a deformed manner for ease of understanding such that the dimensions of the members (e.g., shape or the like of the joints 22 and 23 illustrated in FIGS. 4 and 7) are not represented accurately.

First Embodiment

Figure 1:
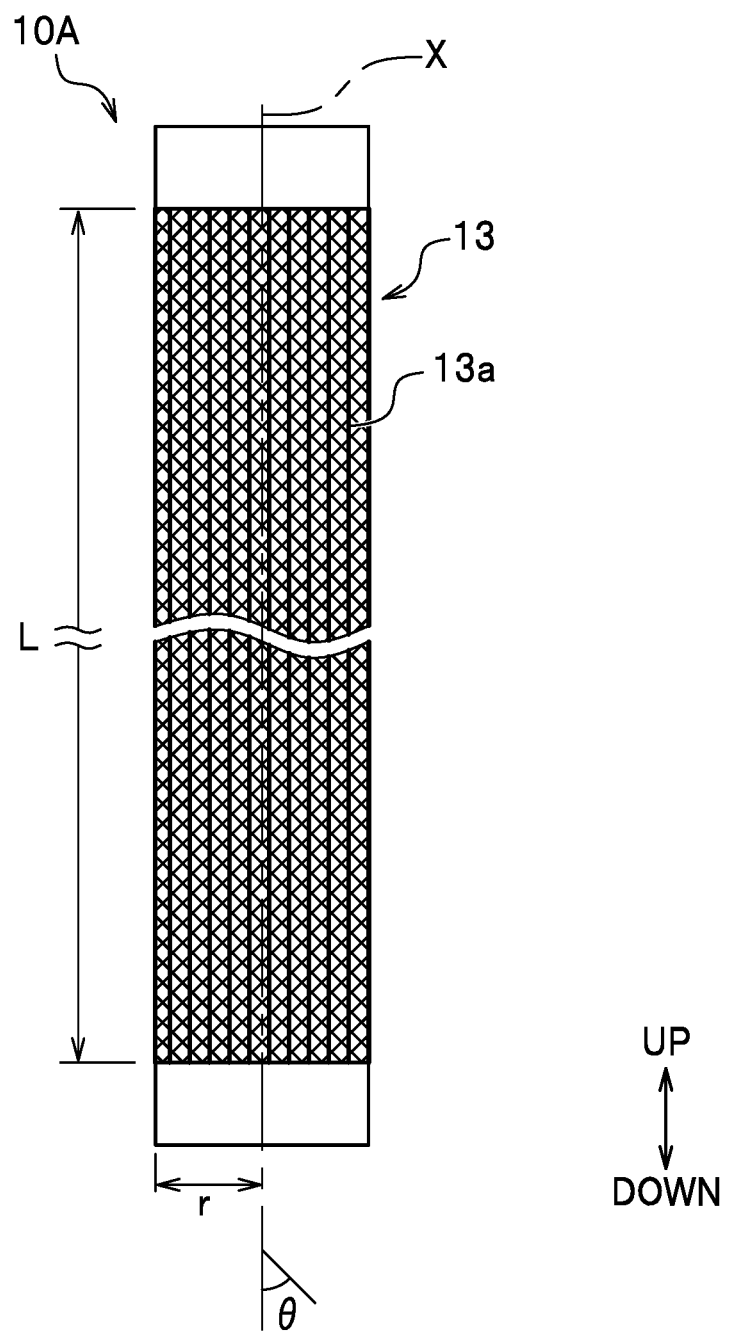
FIG. 1 is a diagram schematically illustrating a tube body intermediate according to a first embodiment of the present invention.
Figure 2:
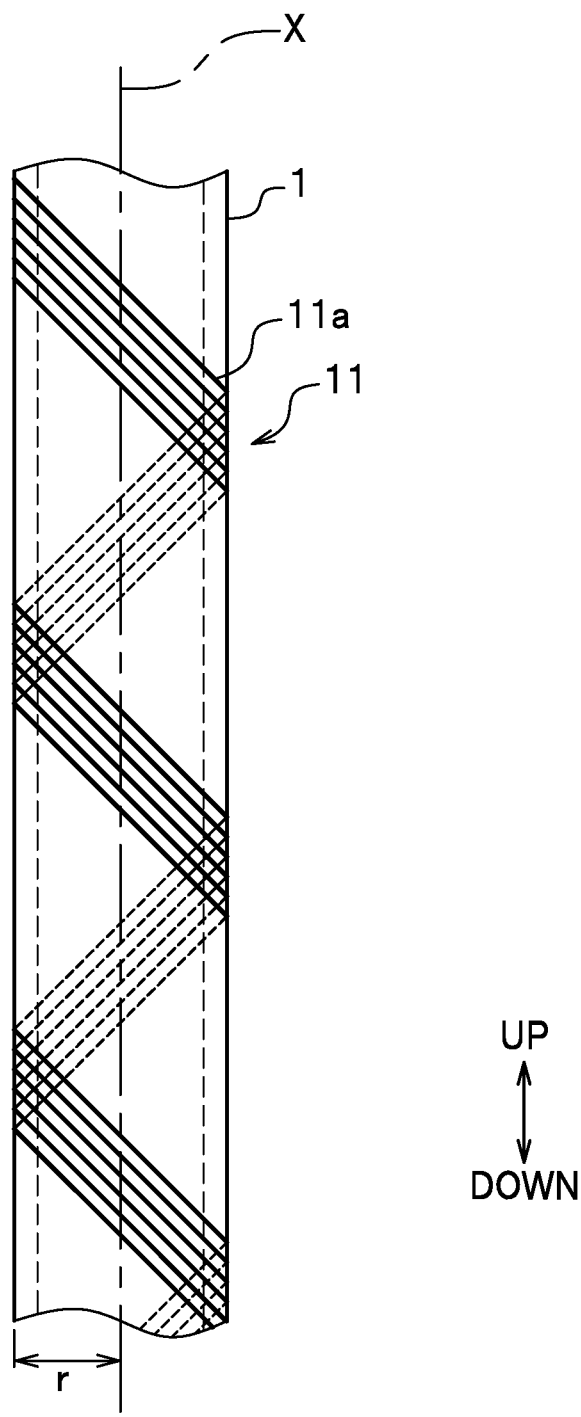
FIG. 2 is a diagram schematically illustrating a mandrel according to the first embodiment of the present invention and a first carbon fiber layer of the tube body intermediate according to the first embodiment of the present invention.

The tube body intermediate 10A illustrated in FIG. 1 is formed by disposing carbon fiber layers on the outer circumferential surface of a mandrel 1 (see FIG. 2). As illustrated in FIG. 2, the mandrel 1 is a metal member having a circular cylindrical tube shape. In the present invention, the mandrel 1 is used in an attitude such that the axial direction of the mandrel 1 coincides with the up-down direction (so-called vertical placement), until a tube body 20A (see FIG. 6) has been produced via the tube body intermediate 10A.

Tube Body Intermediate

Figure 5:
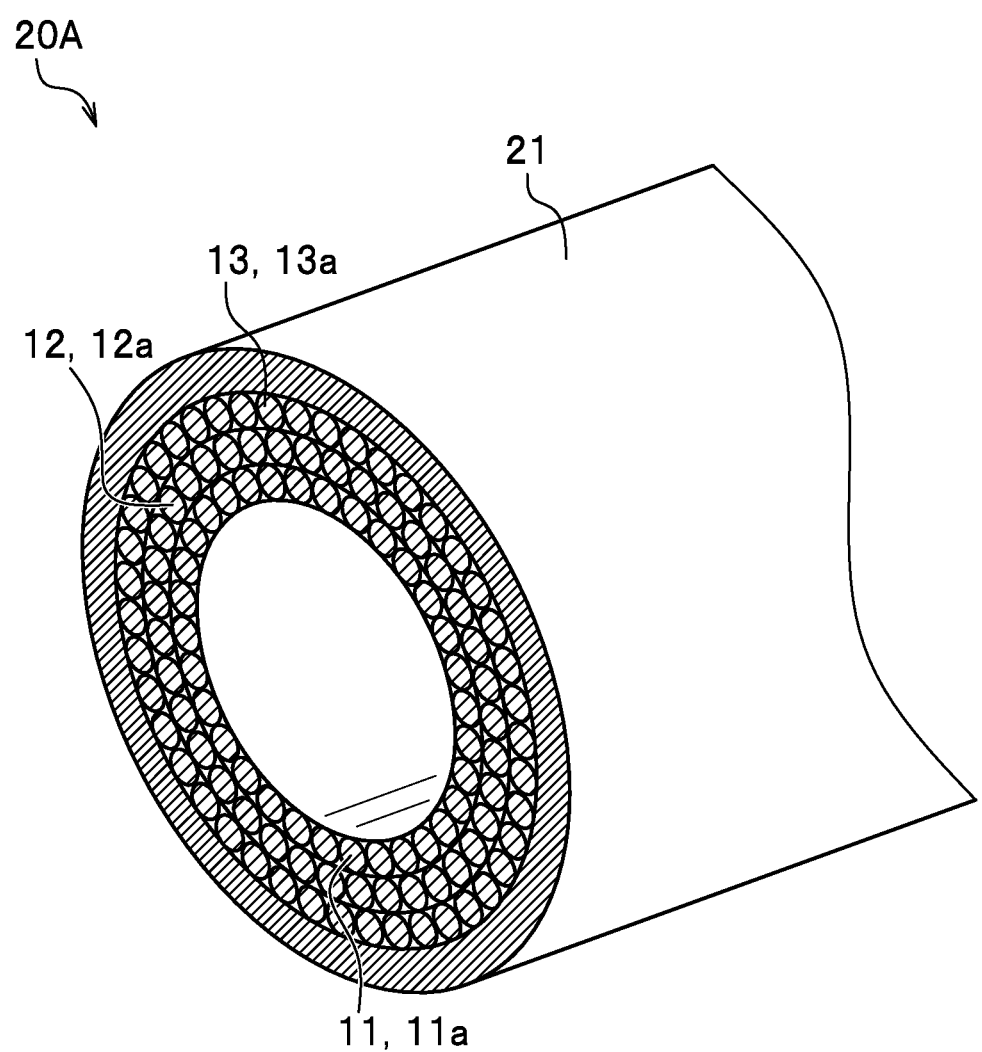
FIG. 5 is a diagram schematically illustrating a tube body produced using the tube body intermediate according to the first embodiment of the present invention.

As illustrated in FIG. 1, the tube body intermediate 10A according to the first embodiment of the present invention is a circular cylindrical tube member which has a plurality of carbon fiber layers stacked one above the other and which is formed in the middle of producing a tube body 20 (see FIG. 5) described later. The tube body intermediate 10A includes, in order from the radially inner side (from the mandrel 1 side), a first carbon fiber layer 11 (see FIG. 2), a second carbon fiber layer 12 (see FIG. 3), and a third carbon fiber layer 13. Note that, FIGS. 1 to 3 only partially illustrate the carbon fiber layers 11, 12, and 13.

First Carbon Fiber Layer

As illustrated in FIG. 2, the first carbon fiber layer 11 is constituted by a plurality of carbon fibers 11a disposed with respect to the outer circumferential surface of the mandrel 1 so as to cover the mandrel 1. The carbon fibers 11a of the first carbon fiber layer 11 are disposed such that the carbon fibers 11a are wound by one or more turns so as to be inclined by 45 degrees with respect to the axial direction of the mandrel 1 and that the carbon fibers 11a extend helically with respect to the axial direction of the mandrel 1. In other words, the orientation angle $\theta$ of the carbon fibers 11a is 45 degrees with respect to the axis X of the mandrel 1.

Second Carbon Fiber Layer

Figure 3:
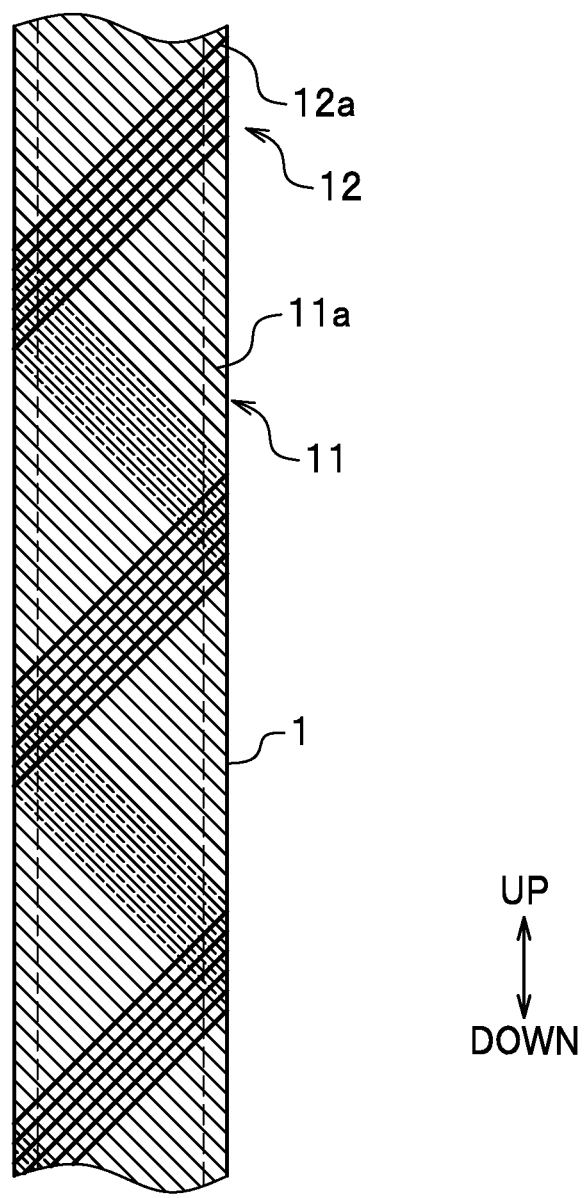
FIG. 3 is a diagram schematically illustrating a second carbon fiber layer of the tube body intermediate according to the first embodiment of the present invention.

As illustrated in FIG. 3, the second carbon fiber layer 12 is disposed on the radially outer side of the first carbon fiber layer 11 and is constituted by a plurality of carbon fibers 12a disposed so as to cover the first carbon fiber layer 11. The carbon fibers 12a of the second carbon fiber layer 12 are disposed such that the carbon fibers 12a are wound by one or more turns so as to be inclined by −45 degrees with respect to the axial direction of the mandrel 1 and that the carbon fibers 12a extend helically with respect to the axial direction of the mandrel 1. In other words, the orientation angle $\theta$ of the carbon fibers 12a is −45 degrees with respect to the axis X of the mandrel 1.

Third Carbon Fiber Layer

As illustrated in FIG. 1, the third carbon fiber layer 13 is disposed on the radially outer side of the second carbon fiber layer 12 and is constituted by a plurality of carbon fibers 13a disposed so as to cover the second carbon fiber layer 12. The carbon fibers 13a of the third carbon fiber layer 13 are disposed to extend in parallel with the axial direction of the mandrel 1. In other words, the orientation angle $\theta$ of the carbon fibers 13a with respect to the axis X of the mandrel 1 is 0 degrees. The carbon fibers 13a has a length equal to an axial direction length L of the mandrel 1 excluding opposite end portions thereof to be held by devices.

Tube Body Production Method

Figure 6:
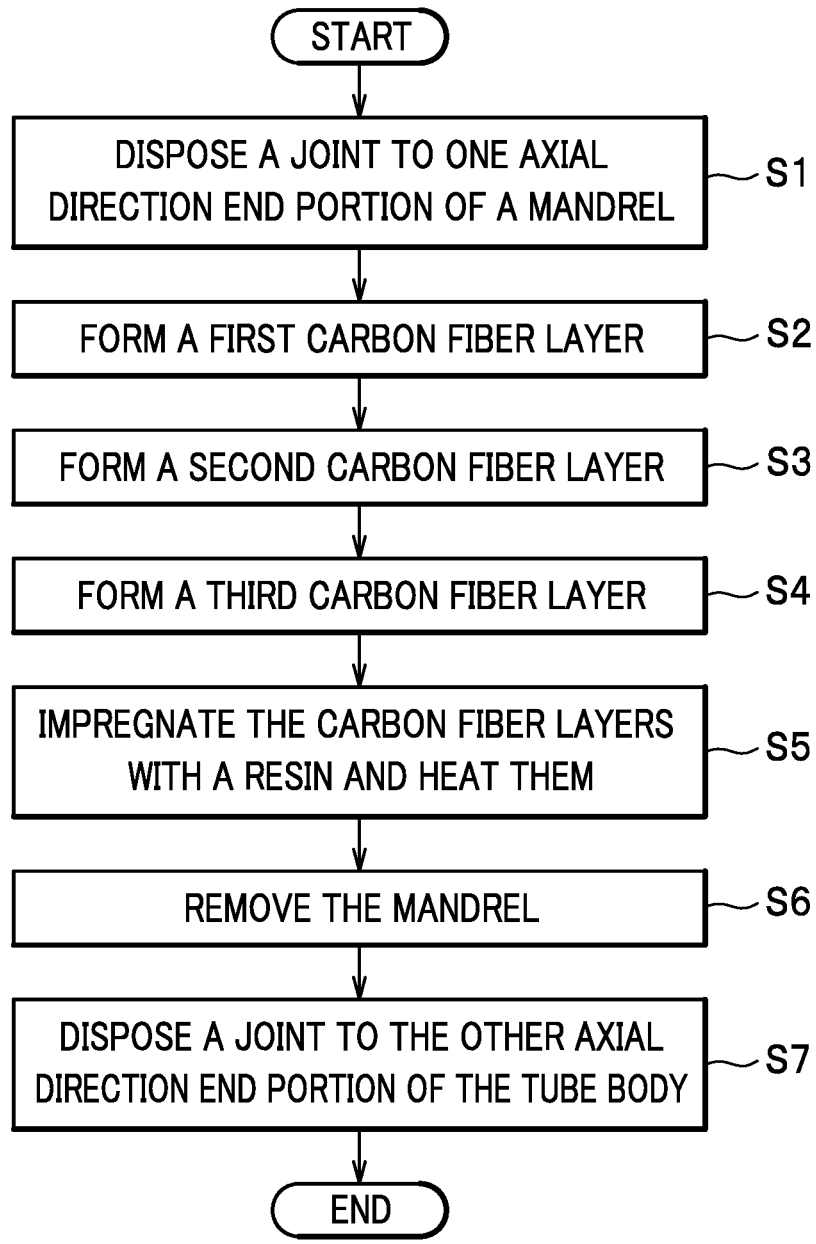
FIG. 6 is a flowchart illustrating a tube body production method according to the first embodiment of the present invention.

Subsequently, a description will be given of a method of producing a tube body via the tube body intermediate 10A according to the first embodiment, using the flowchart illustrated in FIG. 6.

Firstly, a joint (stub yoke or stub shaft) 22 (see FIG. 4) is disposed (step S1: Joint installation step) to one axial direction end portion of the mandrel 1. Subsequently, as illustrated in FIG. 2, the first carbon fiber layer 11 is formed (step S2: First carbon fiber layer forming step) on the outer circumferential surface of the vertically placed mandrel 1 by a not-illustrated device. Subsequently, as illustrated in FIG. 3, the second carbon fiber layer 12 is formed (step S3: Second carbon fiber layer forming step) on the outer circumferential surface of the first carbon fiber layer 11 over the vertically placed mandrel 1 by a not-illustrated device. Subsequently, as illustrated in FIG. 1, the third carbon fiber layer 13 is formed (step S4: Third carbon fiber layer forming step/Disposing step) on the outer circumferential surface of the second carbon fiber layer 12 over the vertically placed mandrel 1 by a not-illustrated device.

The above-described steps from the first carbon fiber layer forming step to the third carbon fiber layer forming step can be said as a tube body intermediate production method configured to produce the tube body intermediate 10A.

Figure 4:
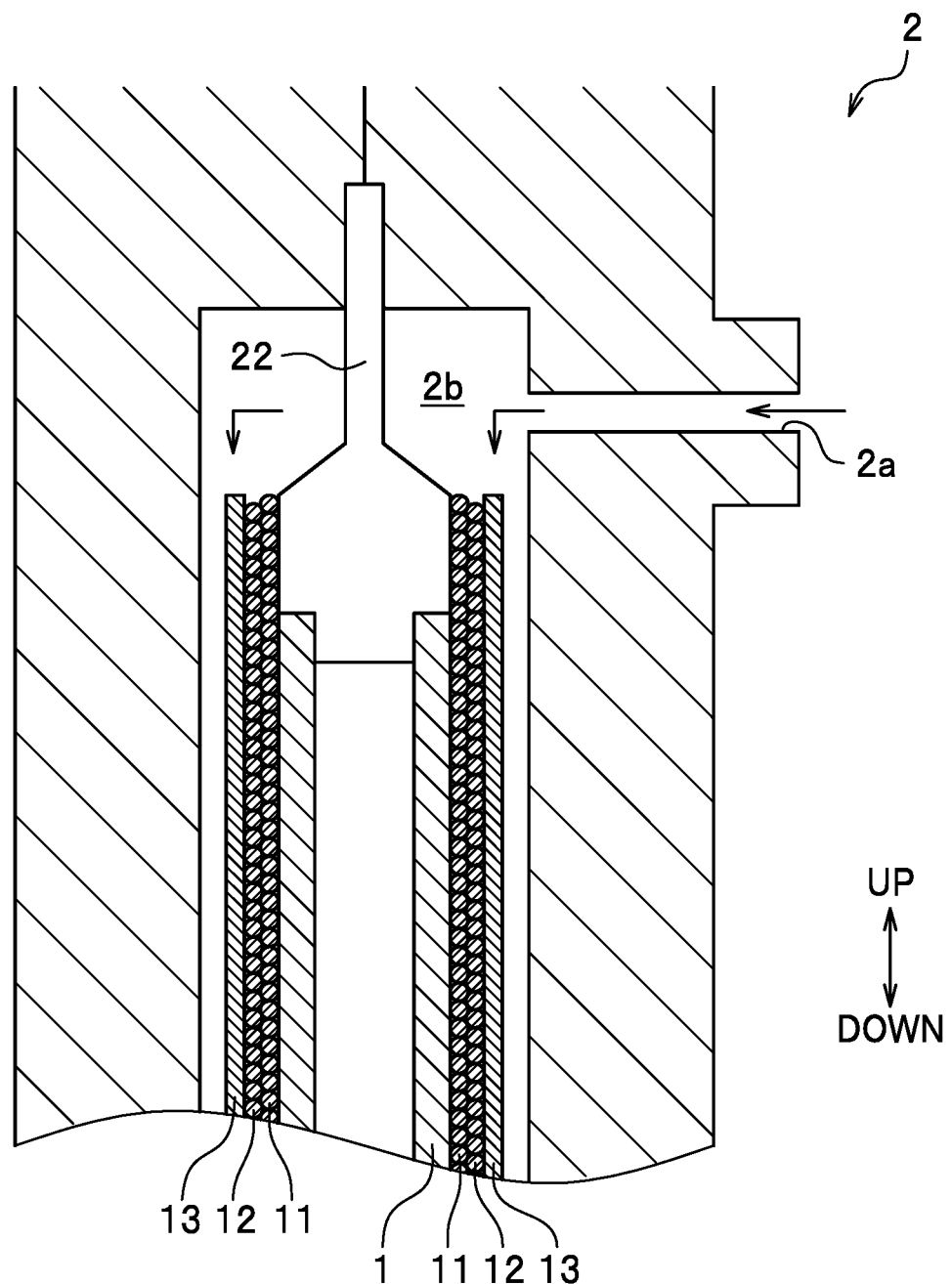
FIG. 4 is a diagram schematically illustrating a molding device for producing the tube body according to the first embodiment of the present invention.

Subsequently, as illustrated in FIG. 4, the first carbon fiber layer 11, the second carbon fiber layer 12, and the third carbon fiber layer 13, over the vertically placed mandrel 1, are impregnated with a resin 21 by a molding device (mold) 2. Then, heat is applied to the molding device 2 to mold (step S5: Molding step) the tube body 20. The resin 21 is, for example, a thermosetting resin. In the case of the present embodiment, the mold of the molding device 2 is divided into plural parts. In the molding step, while applying heat to the tube body intermediate 10A, after a mold closing operation that closes the mold of the molding device 2, a mold clamping operation that applies pressure to the closed mold is performed to increase the pressure in the mold, thereby to facilitate curing of the resin 21. Note that, as the present embodiment is described as using a mold having a plurality of parts, the mold closing operation and the mold clamping operation are described as being performed. However, the mold clamping operation is not necessarily mandatory. In addition, when the mold is not divided into a plurality of parts, such mold closing operation and mold clamping operation are not necessarily mandatory. In the example illustrated in FIG. 4, the joint (stub yoke or stub shaft) 22 is disposed to the one axial direction end portion of the mandrel 1, and the tube body intermediate 10A extends to an outer circumferential surface of the joint 22. Moreover, in the molding device 2, on the egress side of a gate 2a, through which the resin 21 in a molten state is to be injected, a space (resin reservoir 2b) is formed. The resin 21 injected into the molding device 2 moves via the resin reservoir 2b in the axial direction of the mandrel 1. The resin 21 as described above interpenetrates into the first carbon fiber layer 11, the second carbon fiber layer 12, and the third carbon fiber layer 13. In a state where the resin 21 has interpenetrated into the carbon fiber layers 11 to 13, heat is applied to the molding device 2 and pressure is applied inside the molding device 2, thereby to form the tube body 20A. In the present embodiment, at least during the time in which performing the steps from step S4 to step S5, the mandrel 1 is maintained in a state where the axial direction of the mandrel 1 coincides with the up-down direction.

Subsequently, the molded tube body 20A and the mandrel 1 are taken out from the molding device 2 and then the mandrel 1 is pulled out (step S6: Core removal step) from the tube body 20A. Subsequently, a joint (the other stub yoke or stub shaft) 23 (see FIG. 7) is attached (step S7: Joint attachment step) to the other axial direction end portion (lower end portion) of the mandrel 1

The tube body production method according to the first embodiment of the present invention includes: a disposing step of disposing the fiber body (carbon fibers 13a) with respect to the outer circumferential surface of the mandrel 1 so that the fiber body extends in the axial direction of the mandrel 1; and a molding step of impregnating the fiber body with a resin 21 on the outer circumferential surface of the mandrel 1 and then heating the resin 21 to mold the resin 21, wherein the disposing step and the molding step are performed in a state where the axial direction of the mandrel 1 coincides with an up-down direction.

This configuration makes it possible to, while reducing the production cost, reduce displacement of the fiber body even when the orientation angle θ of the fiber body is small, because the fiber body is disposed so that it is difficult for the fiber body to separate from the mandrel 1 due to gravity.

Moreover, according to the tube body production method, in the disposing step, the fiber body is disposed along the axial direction of the mandrel 1.

This configuration makes it possible to, while reducing the production cost, reduce displacement of the fibers even when the orientation angle θ of the fiber body is small, because the fiber body is disposed in a direction along the gravity direction.

Second Embodiment

Subsequently, a description will be given of a tube body intermediate and a tube body production method according to a second embodiment of the present invention, while focusing on differences from the first embodiment.

Figure 8:
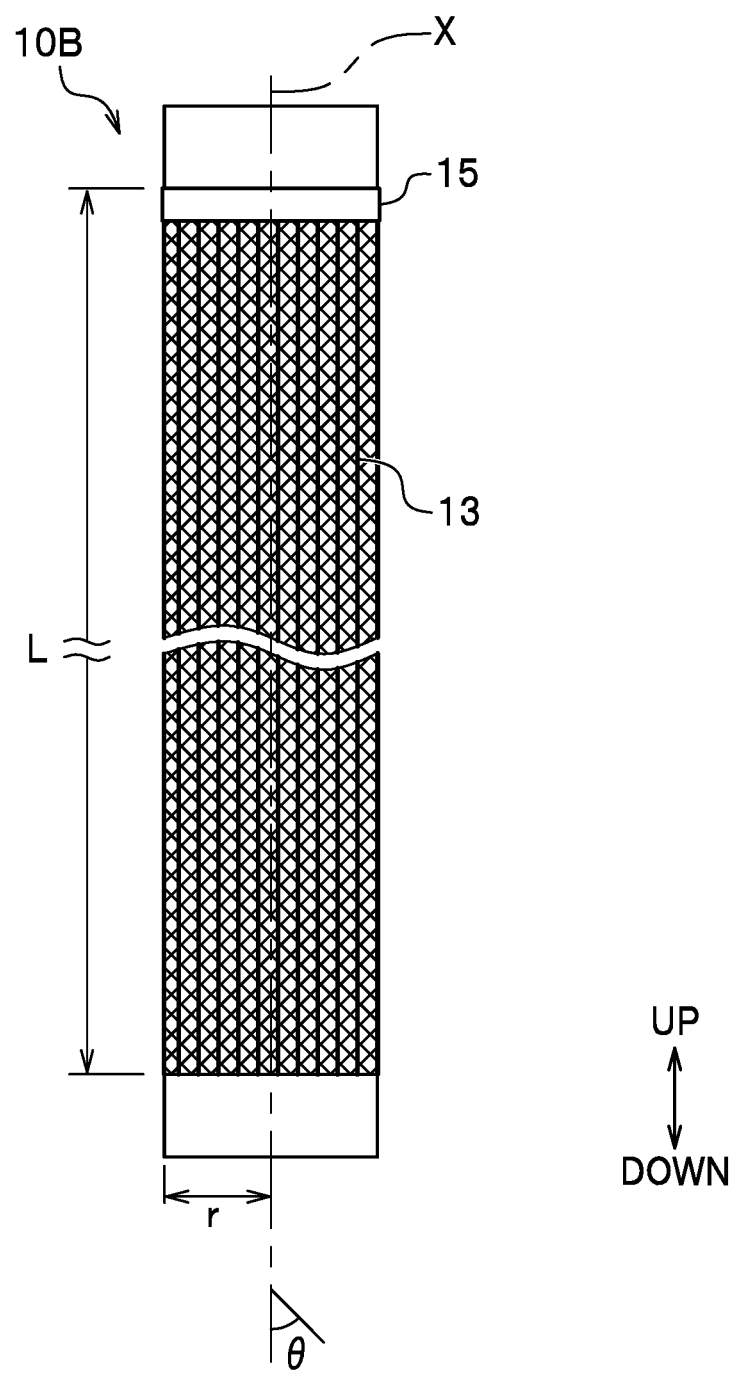
FIG. 8 is a diagram schematically illustrating a tube body intermediate according to a second embodiment of the present invention.

As illustrated in FIG. 8, a tube body intermediate 10B according to the second embodiment of the present invention includes an upper end portion fixing member 15 as a member for fixing the third carbon fiber layer 13.

Upper End Portion Fixing Member

The upper end portion fixing member 15 is a member for fixing an end portion (upper end portion) of the third carbon fiber layer 13 to the outer circumferential surface of an axial direction end portion (upper end portion) of the mandrel 1.

The upper end portion fixing member 15 is a belt-like flexible resin member having an adhesive part on one surface side (on the radially inner surface side).

The upper end portion fixing member 15 is wound in an annular shape.

The upper end portion fixing member 15 may be formed of the same material as the resin 21 or may be formed of a material that melts due to the heat(s) of a molding device (mold) 2 and/or of the resin 21 to mix into the resin 21.

Tube Body Production Method

Figure 9:
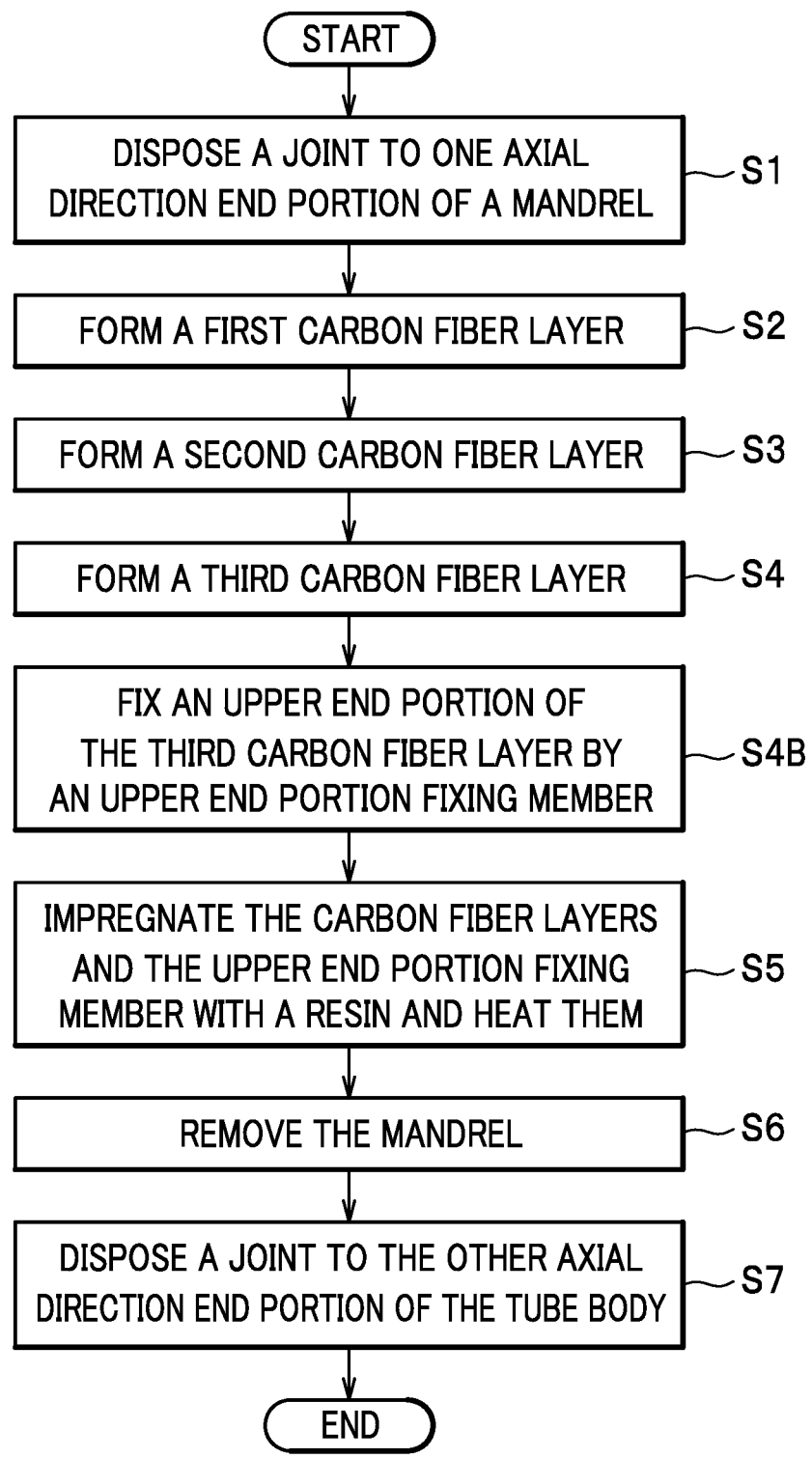
FIG. 9 is a flowchart illustrating a tube body production method according to the second embodiment of the present invention.

Subsequently, a description will be given of a method of producing a tube body 20 via the tube body intermediate 10B according to the second embodiment, using the flowchart illustrated in FIG. 9.

Between the second carbon fiber layer forming step and the molding step, the upper end portion fixing member 15 is disposed on the outer circumferential surface of the upper end portion of the third carbon fiber layer 13 by a not-illustrated device, so that the upper end portion of the third carbon fiber layer 13 is fixed (step S4B, fixation step) with respect to the vertically placed mandrel 1.

The tube body production method according to the second embodiment of the present invention includes, between the disposing step and the molding step, the fixation step of fixing the upper end portion of the fiber body with respect to the outer circumferential surface of the mandrel 1 by the upper end portion fixing member 15.

This configuration makes it possible to, while reducing the production cost, suitably reduce displacement of the fiber body even when the orientation angle θ of the fiber body is small.

Third Embodiment

Subsequently, a description will be given of a tube body intermediate and a tube body production method according to a third embodiment of the present invention, while focusing on differences from the first embodiment.

Tube Body Intermediate

Figure 10A:
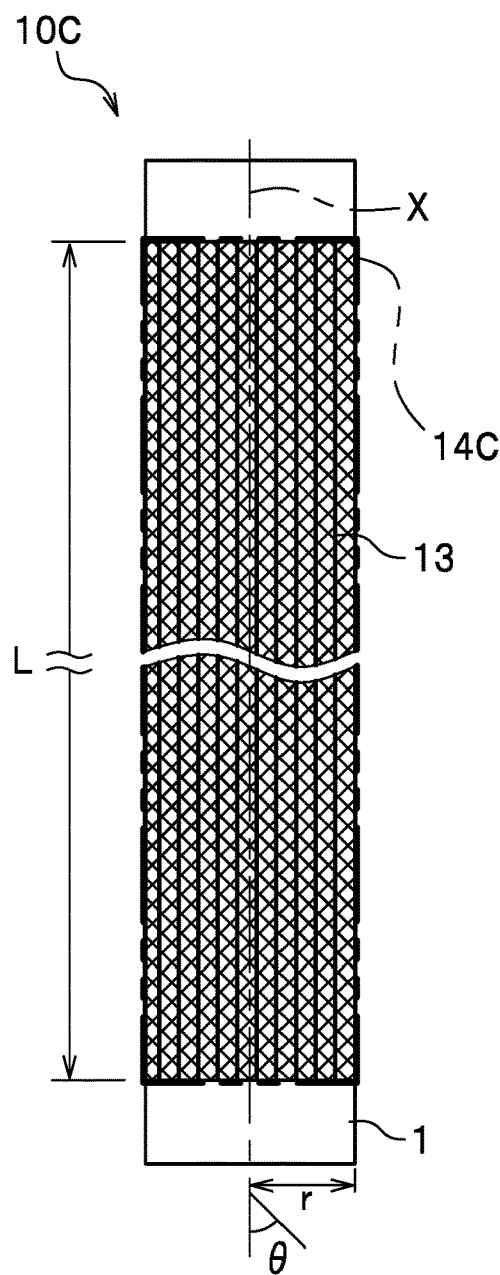
FIG. 10A is a diagram schematically illustrating a tube body intermediate according to a third embodiment of the present invention.

As illustrated in FIG. 10A, a tube body intermediate 10C according to the third embodiment of the present invention includes a fixing member 14c as a member for fixing the third carbon fiber layer 13.

Fixing Member

Figure 10B:
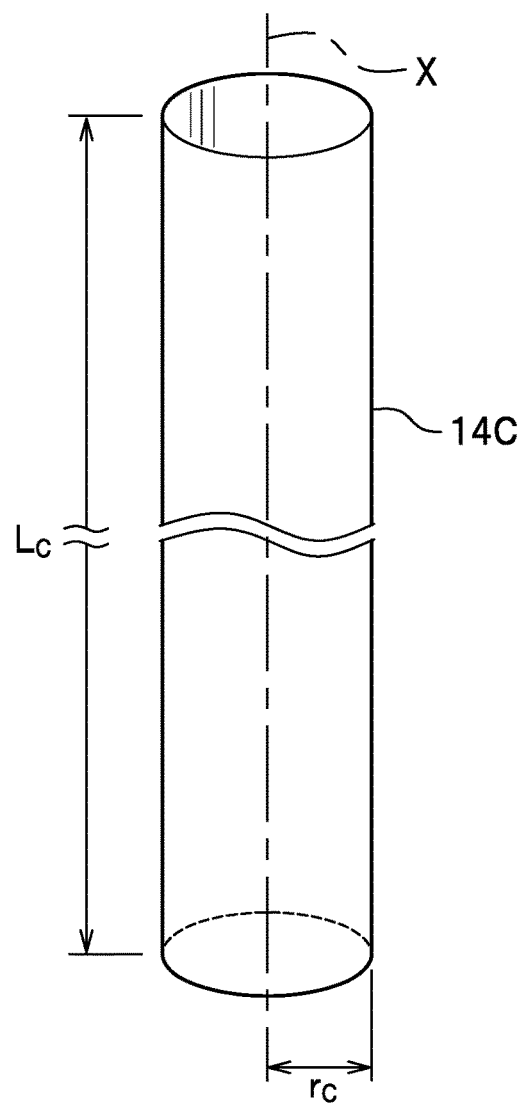
FIG. 10B is a diagram schematically illustrating a fixing member of tube body intermediate.

As illustrated in FIGS. 10A and 10B, the fixing member 14C is a member configured to fix the third carbon fiber layer 13 on the outer circumferential surface of the mandrel 1. The fixing member 14C is a flexible resin member having a tubular shape (circular cylindrical tube shape). The fixing member 14C is formed of a heat shrink member, which shrinks when heat is applied. The fixing member 14C has an axial direction length $L_C$ approximately equal to the axial direction length L of the mandrel 1. The fixing member 14C has an inner diameter $r_C$ approximately equal to an outer diameter r of the mandrel 1. The fixing member 14C as described above is fitted over the mandrel 1 on which the carbon fiber layers 11, 12, and 13 are disposed. The fixing member 14C may have elasticity in the radial direction and may be fitted, in a state of being expanded in the radial direction, over the mandrel 1 on which the carbon fiber layers 11, 12, and 13 are disposed.

The fixing member 14C as described above is disposed to prevent the carbon fibers 13a, which are disposed on the outer circumferential surface of the mandrel 1 placed such that the axial direction thereof extends in the horizontal direction (i.e., which are disposed on the outer circumferential surface of the horizontally placed mandrel 1), from separating from the mandrel 1. Specifically, the fixing member 14C prevents, in the production structure of the tube body, displacement of the fiber body even when a vibration or the like occurs in an axial direction intermediate portion of a portion of carbon fibers 13a located on a lower portion of the outer circumferential surface of the mandrel 1.

Tube Body Production Method

Figure 11:
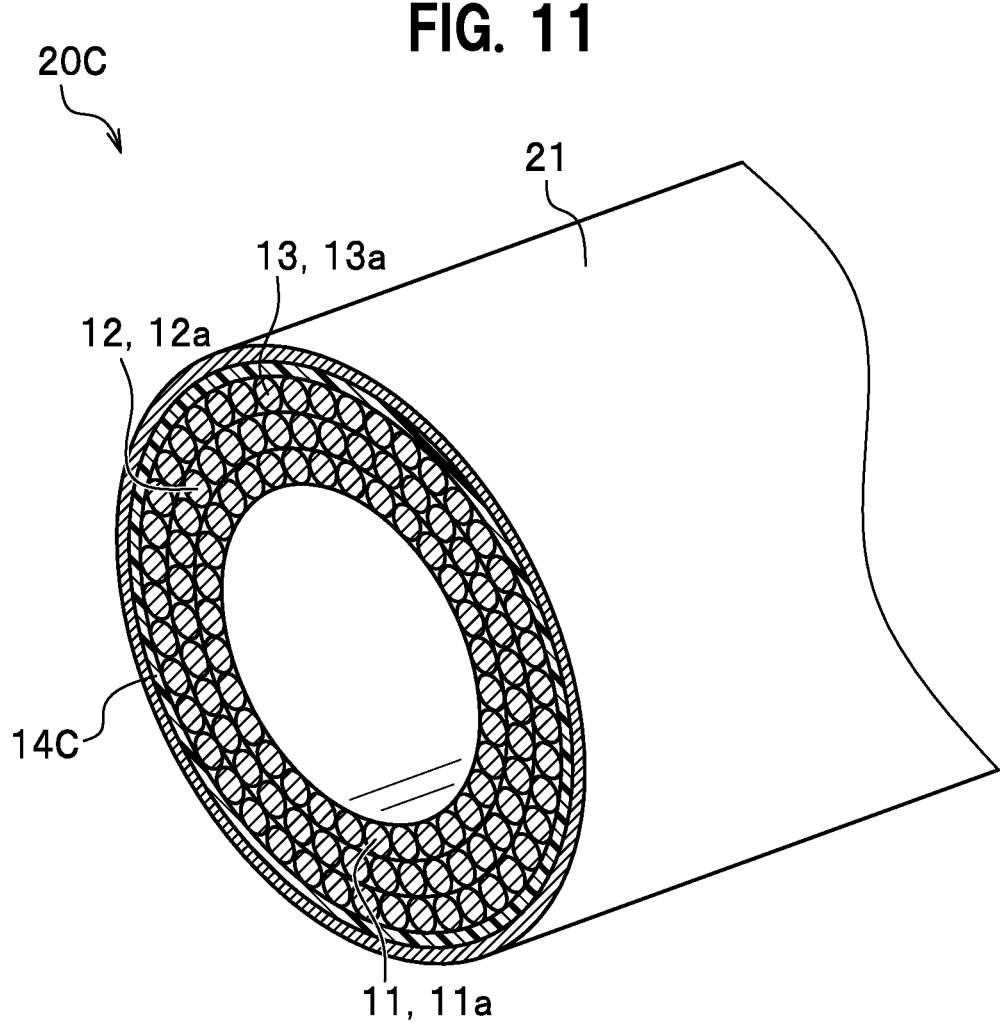
FIG. 11 is a diagram schematically illustrating a tube body produced using the tube body intermediate according to the third embodiment of the present invention.
Figure 12:
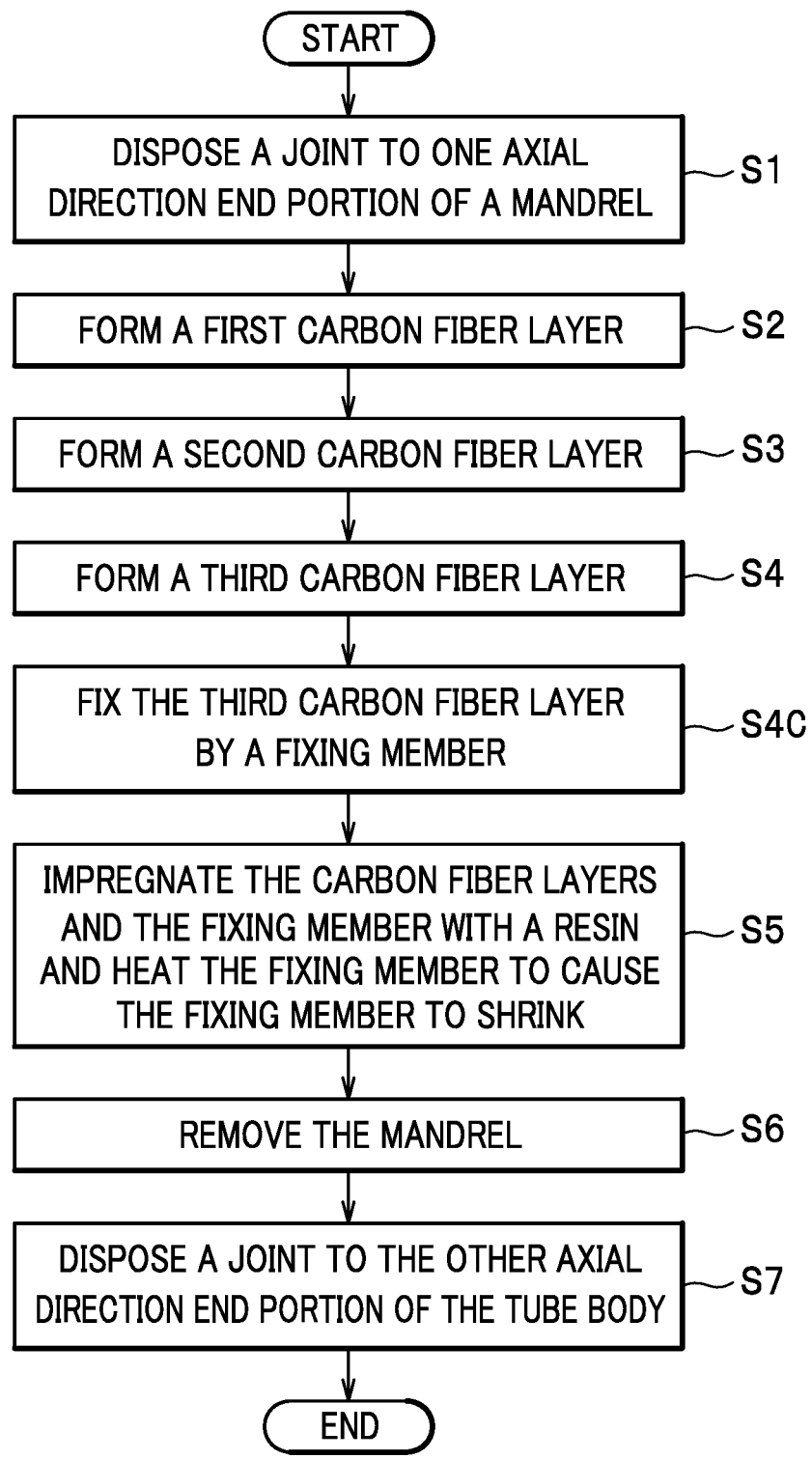
FIG. 12 is a flowchart illustrating a tube body production method according to the third embodiment of the present invention.

Subsequently, a description will be given of a method of producing a tube body 20C (see FIG. 11) via the tube body intermediate 10C according to the first embodiment, using the flowchart illustrated in FIG. 12.

Between the second carbon fiber layer forming step and the molding step, by a not-illustrated device, a fixing member 14A is disposed on the outer circumferential surface of the third carbon fiber layer 13, thereby the third carbon fiber layer 13 is fixed (step S4C: Fixation step) with respect to the vertically placed mandrel 1. As illustrated in FIG. 11, the tube body 20C as produced through such step includes the fixing member 14C, which serves as a protection layer that protects the third carbon fiber layer 13.

The tube body production method according to the third embodiment of the present invention includes, between the disposing step and the molding step, a fixation step S4C of disposing the tubular fixing member 14C with respect to the outer circumferential surface of the mandrel 1 so as to cover the fiber body.

This configuration makes it possible to, while reducing the production cost, reduce displacement of the fiber body even when the orientation angle θ of the fiber body is small.

The tube body production method according to the third embodiment of the present invention includes a shrinkage step that heats the fixing member using heats of the resin and of the molding device, which heats are generated in the molding step, thereby to cause the fixing member to shrink.

This configuration makes it possible to form a protection layer that protects the fiber body, by means of the fixing member 14A that reduces the displacement of the fiber body. Moreover, the configuration makes it possible to cause the fixing member 14C to shrink at the same time as performing the molding step, leading to reduction of production steps compared to a case where the molding step and the shrinkage step are performed separately.

Fourth Embodiment

Subsequently, a description will be given of a tube body intermediate and a tube body production method according to a fourth embodiment of the present invention, while focusing on differences from the third embodiment.

Figure 13A:
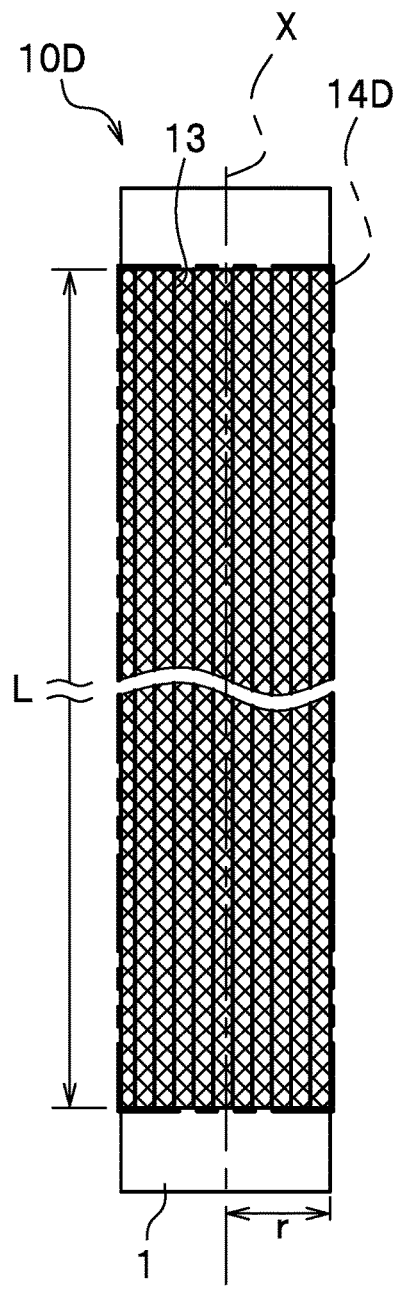
FIG. 13A is a diagram schematically illustrating a tube body intermediate according to a fourth embodiment of the present invention.
Figure 13B:
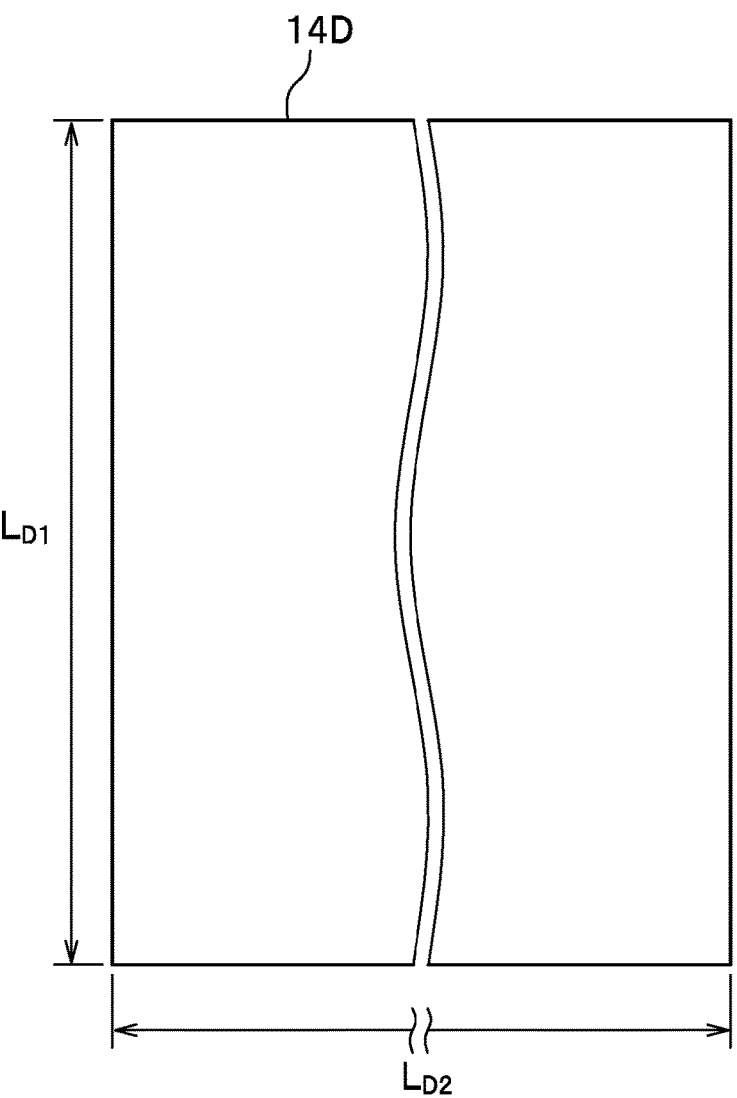
FIG. 13B is a diagram schematically illustrating a fixing member of tube body intermediate.

As illustrated in FIGS. 13A and 13B, a tube body intermediate 10D according to the fourth embodiment of the present invention includes a fixing member 14D in place of the fixing member 14C as a member for fixing the third carbon fiber layer 13.

Fixing Member

The fixing member 14D is a film-like flexible resin member. The fixing member 14D is formed of a heat shrink member, which shrinks when heat is applied. The fixing member 14D has an axial direction length $L_{D1}$ approximately equal to the axial direction length L of the mandrel 1. The fixing member 14D has a dimension $L_{D2}$ in a direction perpendicular to the axial line of the fixing member 14D. This dimension is greater than the circumference $2\pi r$ of the outer circumferential surface of the mandrel 1. This fixing member 14D as described above is wound over the mandrel 1, on which the carbon fiber layers 11, 12, and 13 are disposed, by one or more turns.

Tube Body Production Method

Subsequently, a description will be given of a method of producing a tube body 20 via the tube body intermediate 10D according to the second embodiment.

In the fixation step (step S4C), by a not-illustrated device, the first fixing member 14 is disposed on the outer circumferential surface of the third carbon fiber layer 13, thereby the third carbon fiber layer 13 is fixed with respect to the mandrel 1.

In the tube body production method according to the fourth embodiment of the present invention, the tubular fixing member 14D is a film-like member wound in the circumferential direction by one or more turns.

This configuration makes it possible to dispose the fixing member 14D easily.

Fifth Embodiment

Subsequently, a description will be given of a tube body intermediate and a tube body production method according to a fifth embodiment of the present invention, while focusing on differences from the third embodiment.

Figure 14:
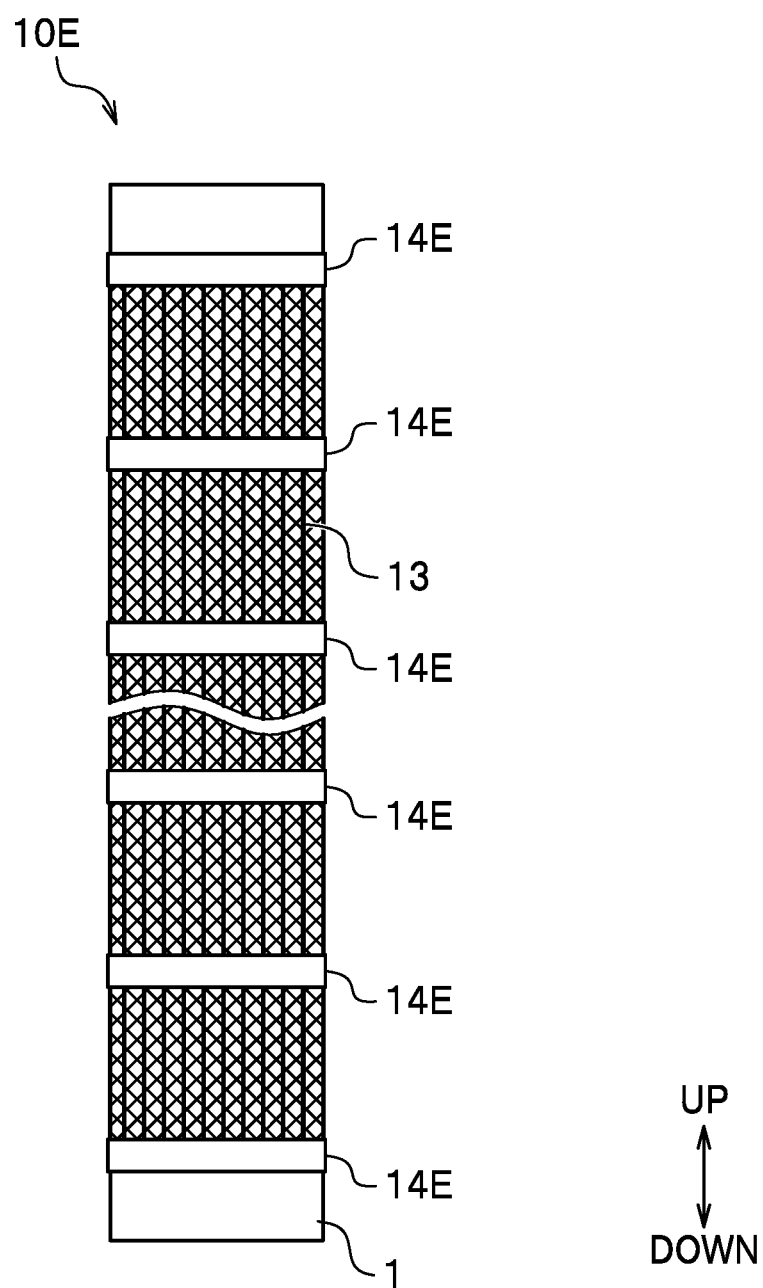
FIG. 14 is a diagram schematically illustrating a tube body intermediate according to a fifth embodiment of the present invention.

As illustrated in FIG. 14, a tube body intermediate 10E according to the fifth embodiment of the present invention includes a plurality of fixing members 14E in place of the fixing member 14C as members for fixing the third carbon fiber layer 13.

Fixing Member

The fixing members 14E are each a flexible resin member having a tubular shape (circular cylindrical tube shape). The fixing members 14E are each formed of a heat shrink member, which shrinks when heat is applied. The fixing members 14E each have an axial direction length smaller than the axial direction length L of the mandrel 1. The fixing members 14E each have an inner diameter approximately equal to an outer diameter r of the mandrel 1. The plurality of fixing members 14E as described above are fitted over the mandrel 1 on which the carbon fiber layers 11, 12, and 13 are disposed, in a manner of being spaced apart at equal intervals. The plurality of fixing members 14E may have elasticity in the radial direction and may be fitted, in a state of being expanded in the radial direction, over the mandrel 1 on which the carbon fiber layers 11, 12, and 13 are disposed.

Tube Body Production Method

Subsequently, a description will be given of a method of producing a tube body 20 via the tube body intermediate 10E according to the fifth embodiment.

In the fixation step (step S4C), by a not-illustrated device, the plurality of fixing members 14E are disposed on the outer circumferential surface of the third carbon fiber layer 13, thereby opposite end portions and axial direction intermediate portions of the third carbon fiber layer 13 are fixed with respect to the mandrel 1.

In the tube body production method according to the fifth embodiment of the present invention, the plurality of fixing members 14E are disposed in a manner of being spaced apart with one another in the axial direction of the mandrel 1.

This configuration reduces the amount of the materials of the fixing members 14E and thus reduces the cost.

Although certain embodiments of the present invention have been described above, it is to be understood that the present invention is not limited only to the above-described embodiments and the embodiments of the present invention can be modified as appropriate within the range not departing from the gist of the invention. For example, the first carbon fiber layer 11 and the second carbon fiber layer 12 may be eliminated and the third carbon fiber layer 13 may be disposed directly on the outer surface of the mandrel 1. Moreover, the orientation angle of the carbon fibers 13a of the third carbon fiber layer 13 is not limited to 0 degrees (not limited to being in parallel to the axial direction of the mandrel 1), but may be an angle such that the carbon fibers 13a are wound by less than one turn with respect to the mandrel 1. In other words, the present invention is preferably applied when the orientation angle θ of the carbon fibers 13a satisfies tan θ<|2πr/L|. Moreover, the fiber bodies used in the tube body intermediates 10A to 10E are not limited to the carbon fibers 11a to 13a and may be other materials capable of reinforcing the tube body 20.

What is claimed is:

1. A tube body production method comprising:
    a disposing step of disposing fibers with respect to an outer circumferential surface of a circular cylindrical tube so that an orientation angle of the fibers with respect to an axis of the circular cylindrical tube is such that the fibers are wound by less than one turn with respect to the circular cylindrical tube, the outer circumferential surface having a circular cylindrical tube shape with a consistent diameter;
    a molding step of impregnating the fibers with a resin on the outer circumferential surface of the circular cylindrical tube and then heating the resin to mold the resin; and
    between the disposing step and the molding step, an upper end portion fixing step of fixing an upper end portion of the fibers with respect to the outer circumferential surface of the circular cylindrical tube by an upper end portion fixing member,
    wherein the disposing step and the molding step are performed in a state where the axial direction of the circular cylindrical tube coincides with an up-down direction, and
    wherein in the molding step, the circular cylindrical tube on which the upper end portion of the fibers have been fixed by the upper end portion fixing member is disposed in a space of a molding device and the resin in a molten state is injected to the space from above the upper end portion to impregnate the fibers with the resin.

2. The tube body production method of claim 1, further comprising,
    wherein the upper end portion fixing member has a tubular shape.

3. The tube body production method of claim 2, further comprising,
    a shrinkage step of heating the upper end portion fixing member using heats of the resin and of the molding device, which heats are generated in the molding step, thereby to cause the upper end portion fixing member to shrink.

4. The tube body production method of claim 2,
    wherein the upper end portion fixing member with the tubular shape is a film-like member wound in a circumferential direction by one or more turns.

5. The tube body production method of claim 2,
    wherein the upper end portion fixing member is a plurality of fixing members, wherein in the upper end portion fixing step, the plurality of fixing members are disposed in a manner of being spaced apart in the axial direction of the circular cylindrical tube.

6. The tube body production method of claim 3,
    wherein the upper end portion fixing member with the tubular shape is a film-like member wound in a circumferential direction by one or more turns.

7. The tube body production method of claim 3,
    wherein the upper end portion fixing member is a plurality of fixing members,
    wherein in the upper end portion fixing step, the plurality of fixing members are disposed in a manner of being spaced apart in the axial direction of the circular cylindrical tube.

8. The tube body production method of claim 1,
    wherein the upper end portion fixing member is formed of a same material as the resin or is formed of a material that melts due to heat(s) of the molding device and/or of the resin to mix into the resin.

* * * * *